United States Patent [19]

Schweinzer et al.

[11] Patent Number: 4,779,587
[45] Date of Patent: Oct. 25, 1988

[54] VALVE-CONTROLLED COMPRESSION-IGNITION ENGINE

[75] Inventors: Franz Schweinzer; Wolfgang Cartellieri, both of Graz, Austria

[73] Assignee: Avl Gesellschaft Für Verbrennungskraftmaschinen Und Messtechnik M.B.H. Prof.Dr.Dr.h.c. Hans List, Graz, Austria

[21] Appl. No.: 129,286

[22] Filed: Dec. 7, 1987

[30] Foreign Application Priority Data

Dec. 12, 1986 [AT] Austria .................................. 3313/86

[51] Int. Cl.⁴ .............................................. F02B 19/08
[52] U.S. Cl. .................................... 123/276; 123/263; 123/279
[58] Field of Search ............... 123/276, 263, 279, 281, 123/285

[56] References Cited

U.S. PATENT DOCUMENTS

| 4,164,913 | 8/1979 | Koniyama et al. | 123/276 |
| 4,207,843 | 6/1980 | List et al. | 123/276 |
| 4,221,190 | 9/1980 | Komiyama et al. | 123/276 |
| 4,281,629 | 8/1981 | List | 123/279 |
| 4,497,309 | 2/1985 | Ivanchenko et al. | 123/276 |
| 4,667,630 | 5/1987 | Sasaki | 123/270 |

FOREIGN PATENT DOCUMENTS 175433 2/1935 Switzerland .................. 123/276

Primary Examiner—Raymond A. Nelli
Attorney, Agent, or Firm—Watson, Cole, Grindle & Watson

[57] ABSTRACT

In a valve-controlled compression-ignition engine with direct fuel injection and an intake passage inducing the inflowing air to rotate around the cylinder axis, an ideal combustion system has been found, combining the advantages of a diesel engine with direct fuel injection and an open combustion recess and those of a diesel engine with a pre-combustion or swirl chamber, while eliminating the main disadvantages of these two basic types. According to the proposals put forward by this invention the restricted passage or throat in the center area of the combustion chamber is bounded by means of a rotationally symmetric center part, whose lower end forms part of the toroidal combustion chamber, and whose top remains slightly below the fuel jet at the upper dead center of the piston, and which constitutes the inner boundary of the narrow ring-shaped scavenge passage leading from the combustion recess to the cylindrical throat, or rather to the cylinder itself.

11 Claims, 3 Drawing Sheets

VALVE-CONTROLLED COMPRESSION-IGNITION ENGINE

BACKGROUND OF THE INVENTION

This invention relates to a valve-controlled compression-ignition engine with direct fuel injection and an intake passage inducing the inflowing air to rotate around the cylinder axis, comprising a toroidal combustion chamber, which is located in the piston and in which almost all of the combustion air is confined towards the end of the compression stroke, whose opening towards the piston top has a reduced diameter, thus forming a restricted passage or throat with a cylindrical boundary and further comprising a rotationally symmetric center part forming part of the toroidal combustion chamber, as well as an injection nozzle, whose holes are located approximately on the axis of the combustion chamber and through which the fuel is fed into the toroidal combustion chamber.

DESCRIPTION OF THE PRIOR ART

An injection-type internal combustion engine of this kind is described in CH-PS No. 175 433, which was published in 1935. Its particular configuration was based on the assumption that the air charge should be able to reach all fuel particles and that the fuel should not collect in drops on the walls of the combustion chamber, as this would retard the process of combustion in addition to making it incomplete, thus causing soot to form in the exhaust system. The toroidal combustion chamber was therefore provided with a multi-hole injection nozzle in such a way that the fuel jets passed the rotary swirl of air twice, once as the air was flowing through the restricted opening in the inner part of the toroid, and again in the outer part of the toroid. This was to achieve through distribution of the fuel in the air charge, thereby ensuring sootless combustion by the fuel and a considerable increase in engine performance. By means of suitable devices the air charge was made to rotate upon entering the working cylinder. The restricted passage separating the combustion chamber from the piston-swept cylinder volume, with a cross-section amounting to $\frac{1}{3}$ to 1/6 of the cross-section of the cylinder, accelarates the rotary motion of the air upon its passage through the opening, adding to it a kind of rotary swirl.

The injection pressures feasible at the time of publication of CH-PS No. 175 433 were much lower than those of today. On the other hand, the mixture-forming energy of the compressed air achievable in this way is not good enough to give the high performance required for modern engines at a low level of injection pressure. For this reason the method described in the above publication is not suitable for handling the necessary amounts of fuel to be injected and turning them into a homogeneous mixture without any fuel deposits on the walls of the combustion chamber, i.e. with the fuel being distributed throughout the air charge.

The low injection pressures in the known type of combustion engine have the disadvantage of low performance at full load due to the incomplete processing of larger quantities of injected fuel. Besides, only a low level of compression can be achieved as there is a rapid drop in the mixture-forming energy at higher compressions accompanied by a reduction in smoke-limited performance at full load. The low compression entails considerable combustion noise, poor starting behavior and high hydrocarbon emission. The high-mixture-forming energy is not maintained long enough, which means that the timing of the ignition has to be sufficiently early for smokeless combustion. This in turn will lead to high combustion noise, high nitric oxide emissions and high peak pressures in the cylinders.

If the high compression $\epsilon = 19:1$ to $22:1$ necessary because of emission requirements, noise and for economic reasons were realized in a combustion engine as described in CH-PS No. 175 433, this would considerably reduce the mixture-forming energy of the compressed air, and thus the smoke-limited performance at full load.

Raising the injection pressure to the peak pressures of 600 to 1000 bar and more which are common today at rate output, would improve the mixture-forming behavior in the above type of combustion engine, but the percentage of fuel collecting on the walls of the combustion chamber would sharply increase (up to 80%) with the level of pressure.

This high percentage of wall deposits will cause the preparation of the mixture to deteriorate if the traditional configuration is used. An incomplete preparation of the mixture increases the combustion noise of the engine due to considerable ignition lags, and is responsible for high soot emission or reduced performance at given smoke levels, higher hydrocarbon emissions and efficiency losses.

It should also be noted that fuel films on the walls of the combustion chamber, which are produced by the individual injection jets, will spread into the low-turbulence zones in the center of the combustion recess, where they cannot be processed properly, with the same negative effects on the operating behavior of the engine as described above.

Internal combustion engines with a swirl chamber or a pre-combustion chamber have other advantages and disadvantages. For instance, they are characterized by low smoke levels at full load due to the mixture energy in the main combustion chamber as the charge is leaving the scavenge port. Other advantages are low noise at a high compression ratio, slow or late combustion and, as a consequence, low NOx and HC values. Among the drawbacks are high fuel consumption due to high heat and throttle losses in the scavenge passage. In addition, the scavenge ports, edges, valve lands and the bottom of the piston are subject to high thermal loads.

SUMMARY OF THE INVENTION

It is an object of the invention to find an ideal combustion system combining the advantages of a diesel engine with direct fuel injection and an open combustion recess, and those of a diesel engine with a pre-combustion of swirl chamber, while eliminating the main disadvantages of the two basic types.

According to this invention this is achieved by limiting the restricted passage or throat in the center area of the combustion chamber by means of the rotationally symmetric center part, whose top remains slightly below the fuel jet at the upper dead center of the piston, and which forms the inner boundary of the narrow, ring-shaped scavenge passage from the combustion chamber in the piston to the cylindrical throat, or rather the cylinder itself, and further by directing the fuel jets of the injection nozzle towards the area between the combustion chamber in the piston and the cylindrical throat. The narrow ring-shaped scavenge passage formed in this way will provide a high mixture-forming energy without reducing the efficiency of the internal combustion engine vis-à-vis the above design with its torodoil combustion recess by excessive throttle or heat losses in the scavenge passage. Any throttle losses are compensated by an increase in mixture-forming energy and a higher combustion rate resulting therefrom. Moreover, at high injection pressures the percentage of fuel deposited on the walls of the combustion chamber is prepared more efficiently that in the known type of combustion engine. Due to the large surface over which the fuel is sprayed the fuel film is removed from the wall more easily, and the center part in the center of the combustion recess prevents any fuel film applied to the wall from reaching the low-turbulence zones of the recess center. At the same time the center part reduces these zones of low turbulence. The center part in the center of the combustion recess and the large useful surface of the recess prevent the fuel films produced by different injection jets from interfering with each other. By removing parts of the fuel film deposited from the outer edge of the center part of the combustion recess in the region of the annular scavenge passage, the zones of increased turbulence in the toroidal part of the recess can be better employed for the purpose of mixture-formation. The special configuration of the center part of the recess will lead to temperatures at its top surface which will further heat the fuel jets passing closely above it, thus assisting in the preparation of the mixture. The high velocity energy generated by the narrow scavenge passage together with the angular momentum of the air charge will maintain its high level in the ring-shaped chamber for a longer period than in the type of combustion chamber described before.

The properties of the ring-shaped combustion chamber as specified by the invention have consequences on the operating behavior of the engine as follows.

Smoke improvement or increase of smoke-limited full load. It is possible to achieve high compressions ($\epsilon = 19:1$ to 24:1) togther with a high torque-speed curve. The advantage of a high compression are low combustion noise due to smaller ignition lags, lower hydrocarbon emissions, improved starting behavior and greater efficiency of the engine. In addition, a "late" ignition timing may be selected without any major increase in smoke, fuel consumption or HC emissions, by utilizing the fact that a high level of mixture-forming energy is maintained over an extend period of time. This implies that nitric oxides, combustion noise and cylinder peak pressure may be kept low.

In further development of the invention the ratio between the width of the ring-shaped scavenge passage and the diamter of the generating circle. of the torus may be 0.2 to 0.9, preferably 0.5 to 0.7. If the ratio between the width of the scavenge passage and the diamter of the generating circle of the torus is smaller than 0.5, a so-called "chamber effect" will result, which will become more marked as the cross-section of the scavenge passage is getting smaller. If the ratio described is greater than 0.2, the "chamber effect" will entail no fuel losses, i.e. the initially low rate of combustion is followed by a high rate towards the end of the combustion process, which is caused by the high mixture energy prevailing in the main combustion chamber when the mixture and its partly burnt component are leaving the ring-shaped chamber. This effect will further assist in the reduction of smoke, nitric oxides and noise.

In a preferred form of the invention the radius of the circle described by the center of the generating circle and that of the generating circle of the torus itself are chosen for a given volume of the combustion chamber such that the surface that may be wetted by the fuel film deposited on the walls is a maximum.

It has proved to be of particular advantage to employ a nozzle with four or five holes, with a mean number of angular momentum of $$(n_D/n)_m = 2.2,$$

$n_D$ being the number of revolutions of the vanes of the angular momentum meter obtained in a stationary test, and n being the engine speed calculated from the measured flow, the index m signifying that the ratio $n_D/n$ represents a mean value integrated from upper to lower dead center during the suction stroke of the engine.

In this context attention is drawn to the paper "Entwick-lungsarbeiten an Ventilkanälen von Viertakt-Dieselmotoren" by G. THIEN (Graz- Austria), especially section C, "Messung der Strömungseigenschaften von Ventilkanälen", published in Österreichische Ingenieurzeitschrift, special print from issue 9, vol. 8 (1965), pp 291–302.

The mean free length of the fuel jet should amount to $20\pm5\%$ of the diamter of the cylinder.

As proposed in a preferred variant of the invention, a homogeneous mixture is achieved if the areas hit by the fuel jets are situated in the area between the cylindrical throat and the toroidal combustion chamber, and if the actual points of impact are evenly distributed over the rim of the recess.

The toroidal combustion chamber may consist of two parts with different radii for the circle described by the center of the generating circle and the generating circle of the torus itself, possibly with a cylindrical part in between. According to a preferred variant the top of the central rotationally symmetric body in the combustion chamber is configured as a cone and/or spherical cap, and all edges in the area of the combustion recess and the scavenge passage as well as in the area of the throat are rounded in order to avoid large thermal loads.

In a further development of the invention the center part and/or the rim of the recess and/or the recess area + the part of the piston carrying the piston rings is made of material whose temperature resistance is greater than that of the rest of the piston; the above parts either are cast integral with the piston body or they are fastened to it detachably.

DESCRIPTION OF THE DRAWINGS

Following is a more detailed description of the invention as illustrated by the attached drawings, in which.

In all Figures identical parts have identical reference numbers.

DETAILED DESCRIPTION OF THE PREFERRED EMBODIMENTS

Figure 1:
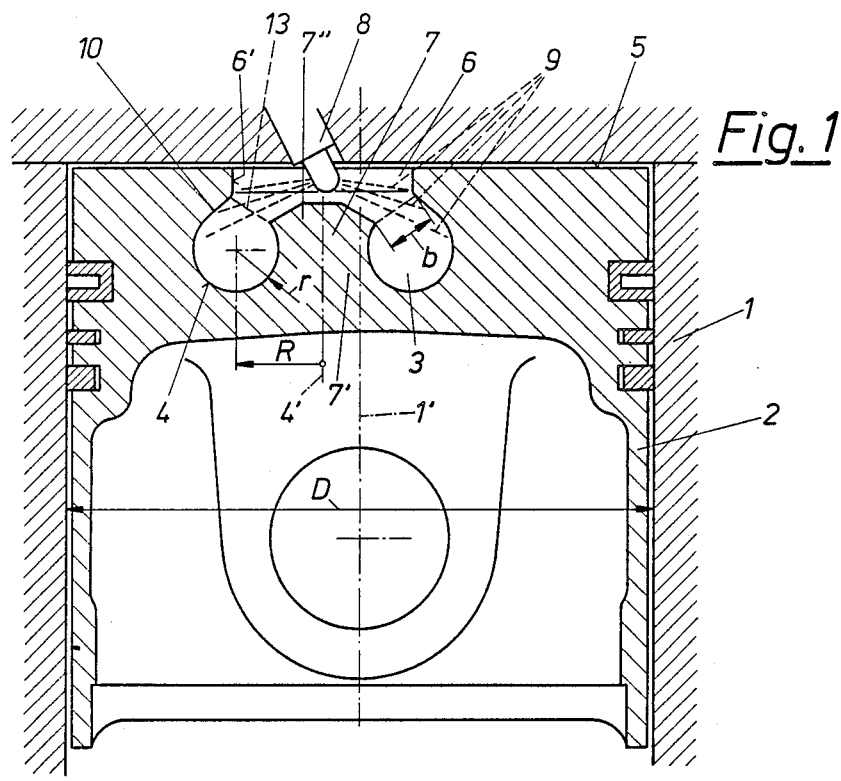
FIG. 1 shows an axial section through the piston and part of the cylinder head of an internal combustion engine as described by the invention.

The piston 2 which is axially movable in the cylinder 1 (diameter D), is provided with a combustion recess 3, which has a toroidal chamber 4, with a radius R for the circle described by the center of the generating circle, and r for the generating circle itself. Furthermore, the combustion recess 3 has an axis 4' parallel to the cylinder axis 1', and an opening towards the piston top 5, representing a restricted passage or throat 6 of the toroidal chamber 4, whose peripheral wall 6' is cylindrical. The combustion recess 3 has a rotationally symmetric center part 7 whose lower end 7' is part of the toroidal chamber 4 of the combustion recess, and whose top 7" remains slightly below the fuel jets 9 delivered by the injection nozzle 8 at the upper dead center of the piston 2, thus ensuring that the top surface of the center part 7, which is shaped like a truncated cone in this variant, will remain largely unwetted by the fuel jets 9. The fuel jets 9 are directed towards the area 10 between the toroidal chamber 4 and the cylindrical wall 6' of the throat. The ring-shaped scavenge passage 13 has a width b.

As far as possible, the combustion recess 3 should be located in the center of the piston 2; in this instance, the axis 4' of the toroidal chamber 4 together with the center part 7 has been slightly shifted relative to the axis 1' of the piston in order to be able to accommodate the valves and the injection nozzle.

Figure 3:
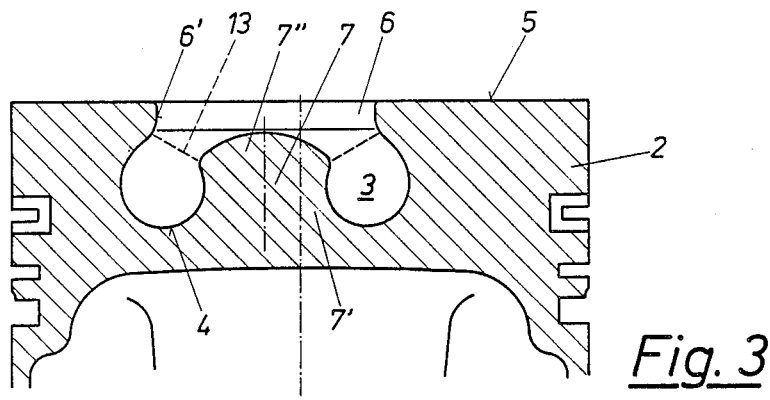

In the variant according to FIG. 3 the toroidal chamber 4 of the combustion recess 3 again communicates with the cylinder at the piston top 5 via the throat 6, whose peripheral wall 6' is cylindrical. The lower end 7' of the rotationally symmetrical center part 7 also forms part of the toroidal chamber 4. The top 7" of the center part 7 is flattened in the manner of a spherical cap. Both this cap 7" and the throat 6 are considerably rounded in all places where they meet the toroidal chamber 4.

Figure 4:
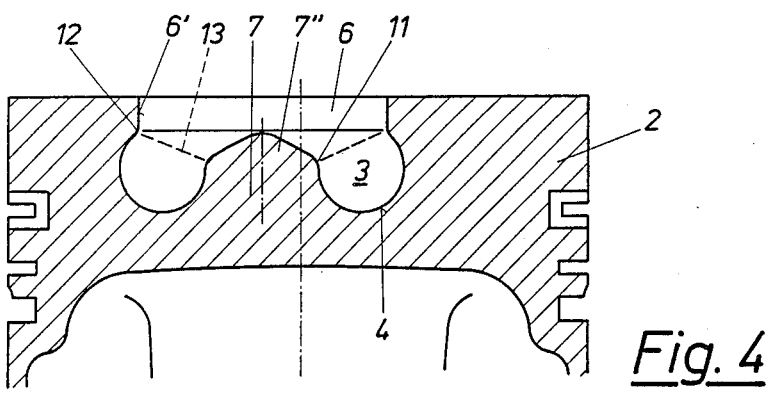

The variant shown in FIG. 4 differs from that in FIG. 1 only in that the top 7" of the center part 7 is a full cone instead of a truncated one. The edges 11 where the toroidal chamber 4 and the top 7" of the center part 7 meet, and the edges 12 where the cylindrical wall 6' of the throat 6 and the toroidal chamber 4 meet, are sharp or only slightly rounded. The ring-shaped scavenge passage 13 leading from the combustion recess 3 to the throat 6 is considerably wider than in the variant according to FIG. 1.

Figure 5:
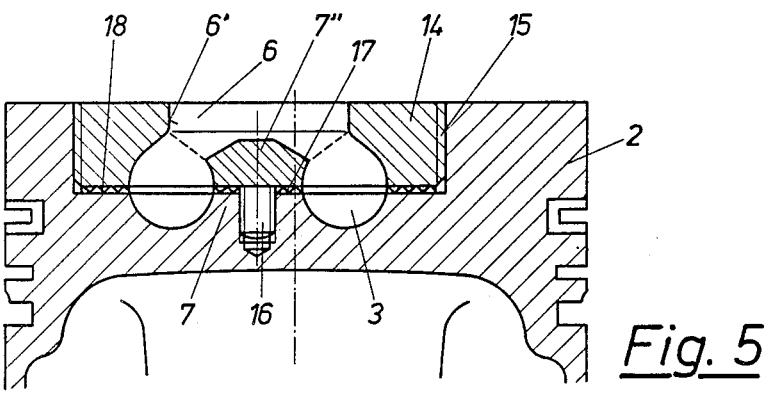

The variant presented in FIG. 5 is similar to that in FIG. 1, with the exception of the screw-fastened rim 14 of the recess and/or the screw-fastened top 7" of the center part 7, which are of the same material as the entire piston 2, or of more temperature-resistant material, for instance, 25Cr20Ni steel. The outer thread of the screw-fastened rim 14 is marked 15, the bolt of the screw-fastened top 7" of the center part 7 is marked 16. Both screw-fastened parts 14 and 7" are sealed against the threads 16 and 15, respectively, and are secured against rotation by means of internal and external tooth lock washer according to DIN 6797 17 and 18, respectively.

Figure 2:
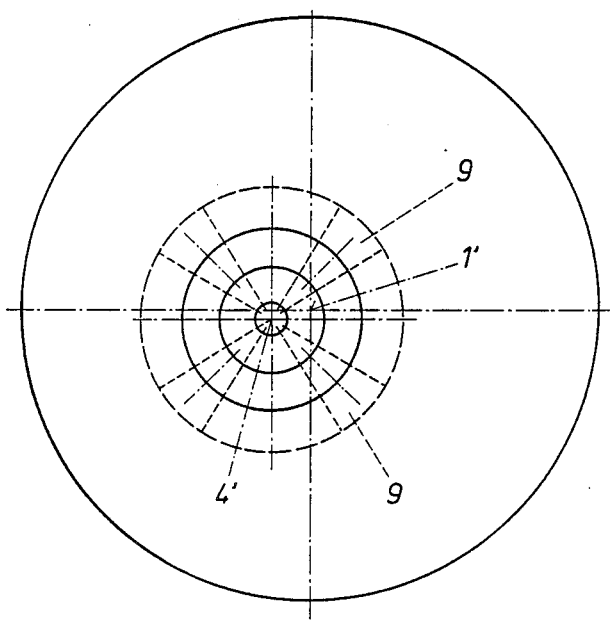
FIG. 2 is a view from above of the piston, FIGS. 3 to 6 each show a partial axial section of another variant of the invention.
Figure 6:
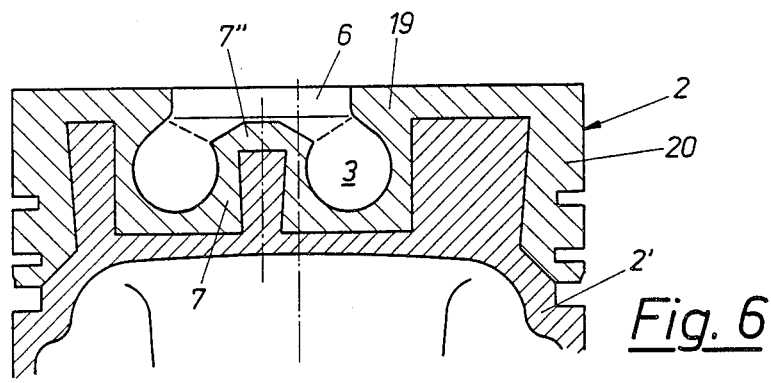
Figure 7:
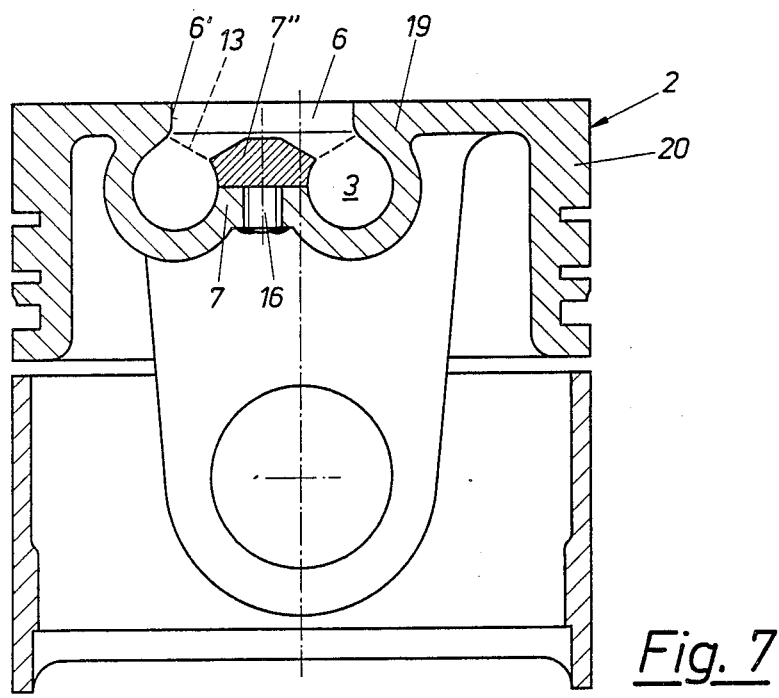
FIG. 7 is a view in axial section of the piston of yet another variant of the invention.

As regards the shape of the combustion recess 3 and the center part 7, the two variants shown in FIGS. 6 and 7 correspond to the variant presented in FIGS. 1 and 2. In the variant according to FIG. 6 the recess area 19 and the part 20 of the piston 2 carrying the piston rings are made of material of higher temperature resistance, for instance, 25Cr20Ni steel; they are either made to form-fit, or they are cast integral with the piston body 2', following the Al-Fin method, the rest of the piston consisting of aluminum alloy commonly used for modern pistons.

FIG. 7 shows a variant of a combustion recess 3 as specified, which is located in an articulated piston with a top part 7" of the center part 7 that is either screw-fastened or welded on. This top part 7" may be made of the same material as the rest of the piston, or it may consist of material with greater temperature stability.

We claim:

1. A valve-controlled compression-ignition engine with direct fuel injection, comprising a cylinder, a piston in said cylinder, an intake passage inducing the inflowing air to rotate around the axis of said cylinder, a toroidal combustion chamber, which is located in said piston and in which almost all of the combustion air is confined towards the end of the compression stroke, an injection nozzle, whose holes are located approximately on the axis of said combustion chamber and through which the fuel is fed into said toroidal combustion chamber, and a rotationally symmetric center part forming part of said toroidal combustion chamber, wherein the opening of said combustion chamber has a reduced diameter, thus forming a restricted passage or throat with a cylindrical boundary, which is bounded in the center area of said combustion chamber by said rotationally symmetric center part, whose top remains slightly below the area of the fuel jet at the upper dead center of said piston, and which forms the inner boundary of the narrow, ring-shaped scavenge passage from said combustion chamber to the cylindrical throat, or rather to said cylinder itself, and wherein the fuel jets of said injection nozzle are directed towards the area between said combustion chamber in said piston and said cylindrical throat.

2. An internal combustion engine according to claim 1, wherein the ratio between the width b of the ring-shaped scavenge passage and the diameter 2r of the generating circle of the torus is 0.2 to 0.9.

3. An internal combustion engine according to claim 1, wherein the ratio between the width b of the ring-shaped scavenge passage and the diameter 2r of the generating circle of the torus is 0.5 to 0.7.

4. An internal combustion engine according to claim 1, wherein the radius R of the circle described by the center of the generating circle and the radius r of the generating circle of the torus itself are chosen for a given volume of said combustion chamber such that the surface that may be wetted by the fuel film deposited on the walls is a maximum.

5. An internal combustion engine according to claim 1, wherein a nozzle with four or five holes is employed, with a mean level of angular momentum of $(n_D/n)_m = 2.2$, $n_D$ denoting the number of revolutions of the vanes of the angular momentum meter, and n the engine speed calculated from the measured flow, the index m signifying that the ratio $n_D/n$ represents a mean value integrated from upper to lower dead center during the suction stroke of the engine.

6. An internal combustion engine according to claim 4, wherein the mean free length of the fuel jet amunts to $20 \pm 5\%$ of the diameter D of said cylinder.

7. An internal combustion engine according to claim 1, wherein the areas hit by the fuel jets are situated in the area between the throat and said toroidal combustion chamber, and wherein the actual points of impact are evenly distributed over the rim of the recess.

8. An internal combustion engine according to claim 1 or 5, wherein said toroidal combustion chamber consists of two parts with different radii R and r, respectively, possibly provided with a cylindrical part in between.

9. An internal combustion engine according to claim 1, wherein the top of said rotationally symmetric center part in the center of said combustion chamber is configured as a cone and/or spherical cap.

10. An internal combustion engine according to claim 1, wherein all edges in the area of said combustion chamber and said throat are rounded in order to avoid large thermal loads.

11. An internal combustion engine according to any of claims 1, 5 or 8, wherein the center part and/or the rim of the recess and/or the recess area plus part of said piston carrying said piston rings are made of material whose temperature resistance is higher than that of the rest of said piston, and wherein these parts either are cast integral with said piston body or are fastened to its detachably.

* * * * *